(12) United States Patent
Amit et al.

(10) Patent No.: US 11,765,307 B1
(45) Date of Patent: Sep. 19, 2023

(54) DIFFING SEQUENTIAL SUBTITLE IMAGES FOR SUBTITLE DELIVERY

(71) Applicant: Synamedia Limited, Staines Upon Thames (GB)

(72) Inventors: Shlomo Amit, Jerusalem (IL); Ilan Cohen, Herzliya (IL); Uziel Joseph Harband, Jerusalem (IL); Thomas Paul Burnley, Winchester (GB)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/979,513

(22) Filed: Nov. 2, 2022

(51) Int. Cl.
*H04N 11/00* (2006.01)
*H04N 5/262* (2006.01)
*H04N 5/278* (2006.01)
*G06F 40/166* (2020.01)
*G10L 15/26* (2006.01)
*H04N 7/025* (2006.01)

(52) U.S. Cl.
CPC ......... *H04N 5/2625* (2013.01); *G06F 40/166* (2020.01); *G10L 15/26* (2013.01); *H04N 5/278* (2013.01); *H04N 7/0255* (2013.01)

(58) Field of Classification Search
CPC ....... H04N 5/278; H04N 7/0255; G10L 15/26
USPC ......................................................... 348/468
See application file for complete search history.

(56) References Cited

U.S. PATENT DOCUMENTS

2009/0316046 A1* 12/2009 Yamazaki ............ G11B 27/036
348/E7.001

* cited by examiner

*Primary Examiner* — Hee Soo Kim
(74) *Attorney, Agent, or Firm* — Fernando & Partners, LLP

(57) ABSTRACT

Various methods, systems, and electronic devices include delivery of sequential subtitle images to a client device. To that end, a method includes obtaining a plurality of sequential subtitle images including a first sequential subtitle image and a second sequential subtitle image. The method includes generating a diff image by comparing the first sequential subtitle image against the second sequential subtitle image. The diff image includes content that is absent from the first sequential subtitle image and present in the second sequential subtitle image. The method includes sending, to the client device, the diff image and display metadata associated with the diff image. The metadata may include a temporal indicator that indicates a display time or display duration of the diff image, and may include a position indicator that indicates a display position of the diff image.

20 Claims, 7 Drawing Sheets

DIFFING SEQUENTIAL SUBTITLE IMAGES FOR SUBTITLE DELIVERY

TECHNICAL FIELD

The present disclosure relates to delivery of subtitles, and in particular, delivery of subtitle images.

BACKGROUND

In certain subtitle delivery systems, a server transmits a sequence of subtitle images to a client device for display. Each subtitle image may include a relatively large amount of content (e.g., many words), which may be difficult for the client device to process in real time. For example, for live closed captions, the transmission data rate of the subtitle images is relatively high, exacerbating the processing difficulties.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1A:
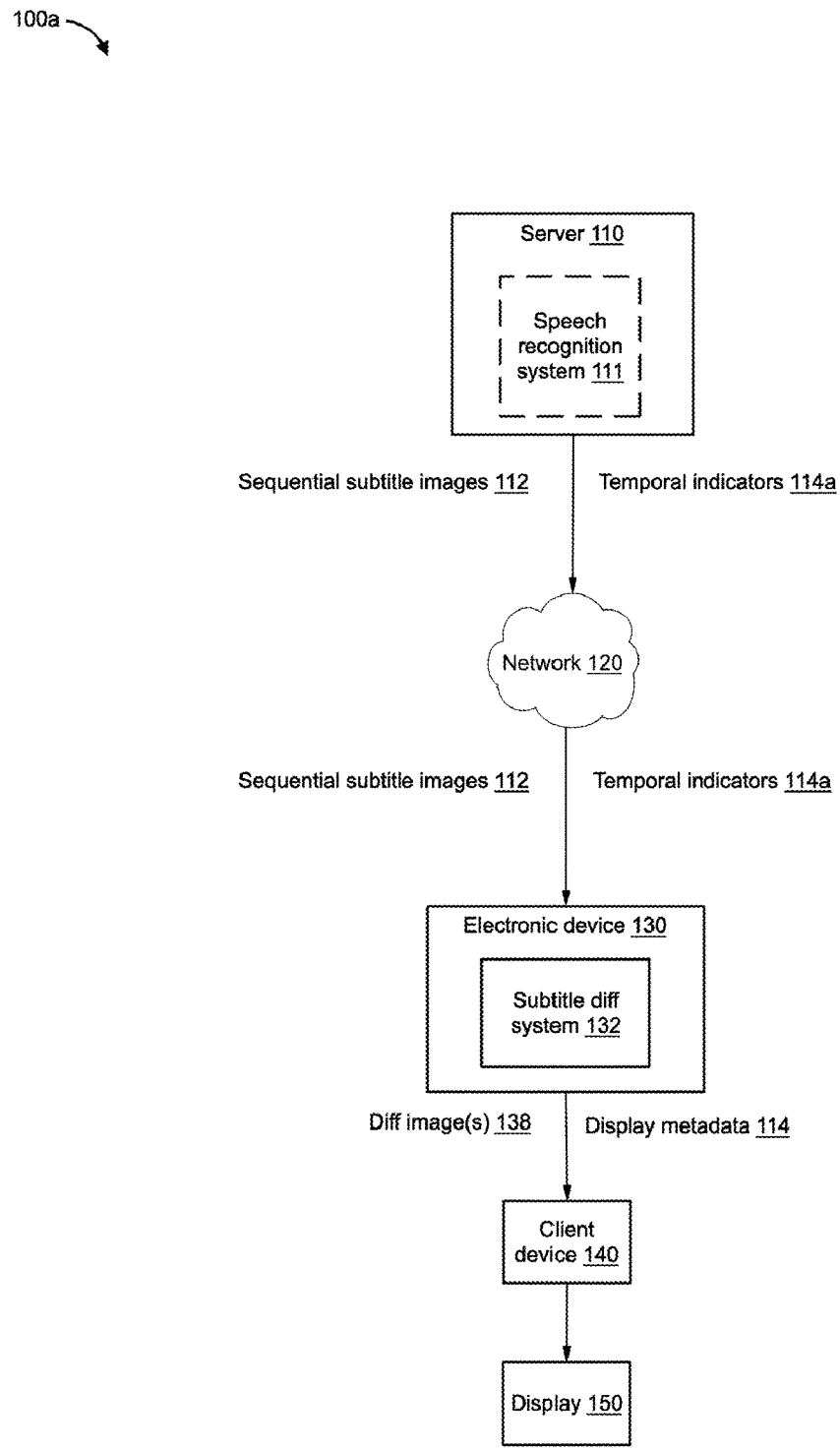
FIG. 1A is an example of a first subtitle delivery system in accordance with some embodiments.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Various embodiments disclosed herein include an electronic device transmitting a diff image to a client device, rather than transmitting a full corresponding subtitle image. For example, whereas the full corresponding subtitle image includes multiple words, the diff image includes a single word. Sending the diff image results in a lower transmission data rate, because the diff image contains less information than the full corresponding subtitle image. Accordingly, the client device receives less subtitle information over a given period of time, thereby reducing processing demands of the client device. To that end, the electronic device generates a diff image based on a first sequential subtitle image and a second sequential subtitle image. For example, the first sequential subtitle image includes the text "Mike", and the second sequential subtitle image includes the text "Mike enjoys." Continuing with this example, the electronic device compares the first sequential subtitle image against the second sequential subtitle image, in order to generate a diff image including diff content of "enjoys." Rather than transmitting "Mike" and then transmitting "Mike enjoys," the electronic device transmits the first sequential subtitle image including "Mike", and then transmits the diff image including "enjoys." Further to that end, the electronic device transmits display metadata associated with the diff image, which enables the client device to properly display the diff image (e.g., relative to the display of the first sequential subtitle image). The display metadata may include a display position indicator that indicates a display position of the diff image on a display of the client device. The display metadata may include a temporal indicator that includes temporal information regarding display of the diff image.

In accordance with some embodiments, a method is performed at an electronic device including a processor and a non-transitory memory. The method includes obtaining a plurality of sequential subtitle images including a first sequential subtitle image and a second sequential subtitle image. The method includes generating a diff image by comparing the first sequential subtitle image against the second sequential subtitle image. The diff image includes content that is absent from the first sequential subtitle image and present in the second sequential subtitle image. The method includes sending, to a client device, the diff image and display metadata associated with the diff image.

In accordance with some embodiments, an electronic device includes a processor and a non-transitory memory. The one or more programs are stored in the non-transitory memory and configured to be executed by the processor and the one or more programs include instructions for performing or causing performance of the operations of any of the methods described herein. In accordance with some embodiments, a non-transitory computer readable storage medium has stored therein instructions which when executed by a processor of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

In certain subtitle delivery systems, subtitles are transmitted from a server to a client device for display on the client device, concurrent with display of a corresponding video stream. The subtitles may comprise a sequence of subtitle images. In some circumstances, a first subtitle image includes first content (e.g., a first word of a sentence), and a second subtitle image includes the first content and second content (e.g., the first word and a second word of the sentence). Accordingly, the client device may display the first subtitle image for a certain period of time, and may display the second subtitle image after ceasing to display the first subtitle image. In these circumstances, a particular subtitle image may include a relatively large amount of content (e.g., many words), which may be difficult for the client device to process (e.g., decompress, decode, and render) in real time. For example, for live closed captions, the transmission data rate of the subtitle images is relatively high, exacerbating the processing difficulties.

By contrast, various embodiments described below provide more efficient subtitle delivery techniques.

Example Embodiments

FIG. 1A is an example of a first subtitle delivery system 100a in accordance with some embodiments. The first subtitle delivery system 100a includes a server 110, a network 120, an electronic device 130, a client device 140, and a display 150. According to various embodiments, the electronic device 130 generates one or more diff images 138 based on a plurality of sequential subtitle images 112, and transmits the diff image(s) 138 and display metadata 114 to the client device 140.

The server 110 transmits, via the network 120, the plurality of sequential subtitle images 112 to the electronic device 130. In some embodiments, the server 110 and the electronic device 130 communicate via a low latency peer-to-peer (P2P) protocol, such as via Web Real-Time Communication (WebRTC). For example, the electronic device 130 may be a WebRTC server, whereas the server 110 is a content delivery network (CDN) server. The network 120 may correspond to a personal area network (PAN), wired local area network (LAN), wireless local area network (WLAN), wireless wide area networks (WWAN), etc. In some embodiments, the network 120 corresponds to a CDN. In some embodiments, the server 110 transmits a media object (e.g., audio data and video data) to the electronic device 130, which, in turn, relays the media object to the client device 140 for playback. In some embodiments, the server 110 generates the plurality of sequential subtitle images 112. For example, the server 110 may include a speech recognition system 111 that generates the plurality of sequential subtitle images 112 based on audio data of a media object.

In some embodiments, the server 110 also transmits, to the electronic device 130 via the network 120, a plurality of temporal indicators 114a respectively associated with the plurality of sequential subtitle images 112. For example, each of the plurality of temporal indicators 114a may indicate a display time (e.g., start time, stop time, duration) associated with a corresponding one of the plurality of sequential subtitle image 112. The plurality of temporal indicators 114a is part of the display metadata 114.

Figure 1B:
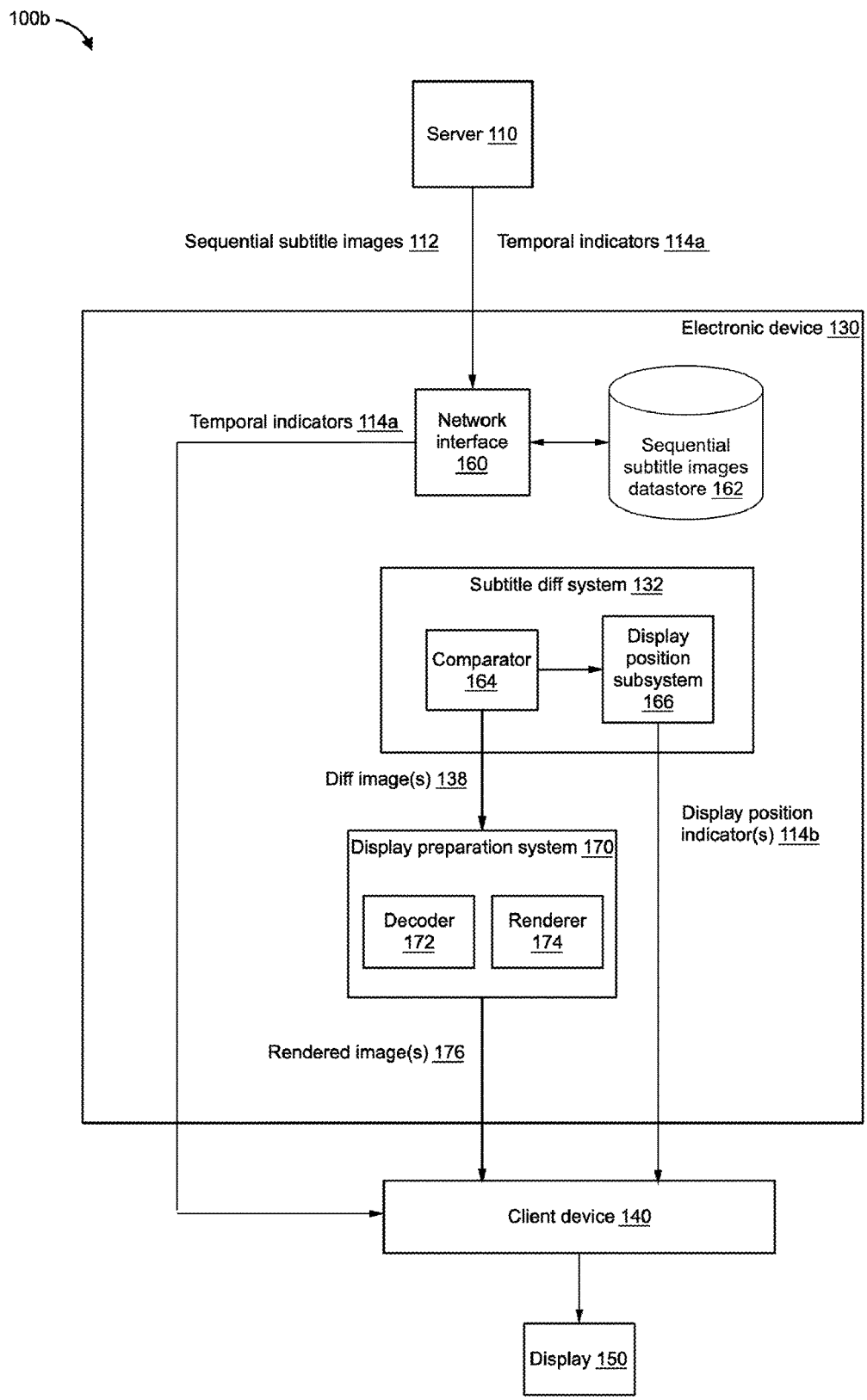
FIG. 1B is an example of a second subtitle delivery system in accordance with some embodiments.

Moreover, according to various embodiments, the display metadata 114 may also include one or more display position indicators 114b, as illustrated in FIG. 1B. Each of the display position indicator(s) 114b indicates a display position of a corresponding one of the diff image(s) 138. According to various embodiments, the electronic device 130 includes a subtitle diff system 132 that determines the display position indicator(s) 114b as part of a diffing process.

The electronic device 130 transmits the display metadata 114 to the client device 140. The display metadata 114 enables the client device 140 to appropriately display the diff image(s) 138 on the display 150. As illustrated in FIG. 1A, the client device 140 and the display 150 are shown as separate components (e.g., separate devices). For example, in some embodiments, the client device 140 is an adapter that plugs into the display 150, such as a dongle plugging into a TV. Although FIG. 1 illustrates the client device 140 as separate from the display 150, in some embodiments, the client device 140 and the display 150 are integrated into a common device, such as a television. For example, each of the client device 140 and the display device 150 is a respective hardware component of a smart television.

FIG. 1B is an example of a second subtitle delivery system 100b in accordance with some embodiments. The first subtitle delivery system 100a includes the server 110, the electronic device 130, the client device 140, and the display 150. The network 120 is omitted from illustration for the sake of clarity.

In some embodiments, the electronic device 130 includes a network interface 160 that enables communication with the server 110 via the network 120. In some embodiments, the electronic device 130 includes a sequential subtitle images datastore 162 (e.g., a non-transitory memory, such as a cache) to store at least a portion of the plurality of sequential subtitle images 112. For example, the electronic device 130 caches a portion of the plurality of sequential subtitle images 112 in the sequential subtitle images datastore 162 to enable more efficient diff operations.

In various embodiments, the plurality of sequential subtitle images 112 includes a relatively large amount of information. For example, a particular sequential subtitle image may include multiple words. Accordingly, in some embodiments, obtaining the plurality of sequential subtitle images 112 is according to a data rate that exceeds a nominal processing threshold associated with the processor of the electronic device. Accordingly, decoding and rendering each of the plurality of sequential subtitle images 112 in real time may be difficult.

Accordingly, in contrast to other subtitle delivery systems, the subtitle diff system 132 performs one or more diff operations with respect to the plurality of sequential subtitle images 112. For example, the subtitle diff system 132 includes a comparator 164 that compares a first sequential subtitle image against a second sequential subtitle image. Continuing with this example, the first sequential subtitle image includes "Mike", whereas the second sequential subtitle image includes "Mike likes." Thus, based on a comparison, the comparator 164 determines a diff image 138 including "likes," but not including "Mike." To that end, the comparator 164 may remove "Mike" from the sequential subtitle image. Additional examples of diff operations are described with reference to FIGS. 2A-2H.

Moreover, in some embodiments, the subtitle diff system 132 includes a display position subsystem 166. The display position subsystem 166 may determine, based on the comparison via the comparator 164, one or more display position indicator(s) 114b respectively associated with the diff image(s) 138. Continuing with the previous example, the display position subsystem 166 determines a display position indicator for the diff image including "likes." The display position may indicator indicate that the diff image should be displayed offset to the right of (e.g., higher x value) by a certain amount, and vertically aligned with (e.g., same y value) the first sequential subtitle image including "Mike."

In some embodiments, the electronic device 130 includes a display preparation system 170 that prepares the diff image(s) 138 for display. Continuing with the previous example, the comparator 164 provides, to the display preparation system 170, the first sequential subtitle image ("Mike") and the diff image ("likes"). In turn, the display preparation system 170 decodes (via a decoder 172) and renders (via a renderer 174) each of the first sequential subtitle image and the diff image. The rendered image(s) 176 are transmitted to the client device 140, which may facilitate display of the rendered image(s) 176 on the display 150 according to the display metadata 114.

FIGS. 2A-2H are an example of a dataflow of diffing sequential subtitle images for display in accordance with some embodiments. In various embodiments, the example described with reference to FIGS. 2A-2H are performed by an electronic device, such as the electronic device 130 of FIG. 1A or 1B.

Figure 2A:
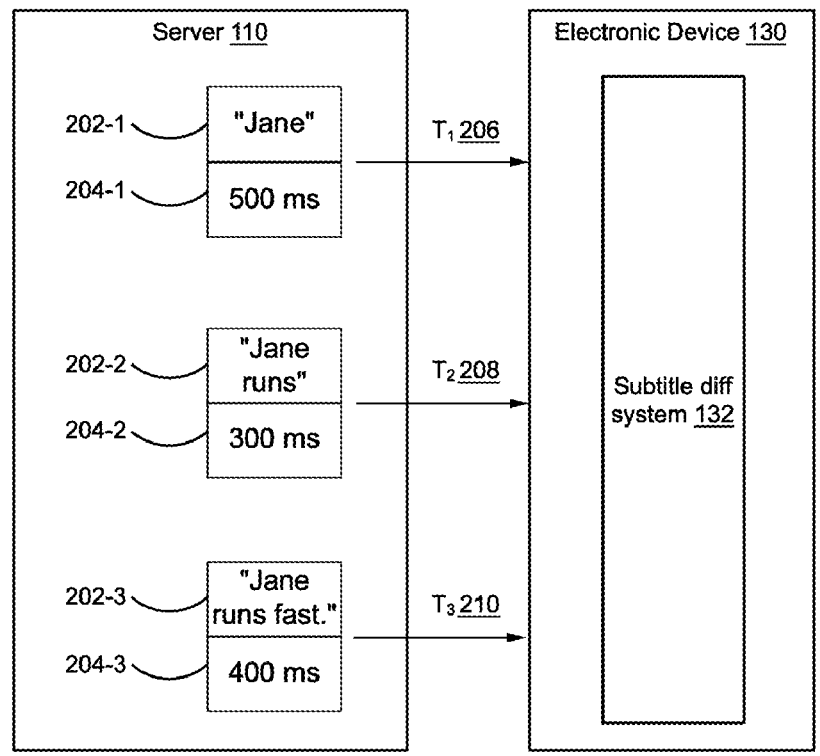
FIGS. 2A-2H are an example of a dataflow of diffing sequential subtitle images for display in accordance with some embodiments.

The server 110 transmits, to the electronic device 130, a plurality of sequential subtitle images that comprise a text string of "Jane runs fast." Namely, as illustrated in FIG. 2A, the server 110 transmits, to the electronic device 130 at a first time $T_1$ 206, a first sequential subtitle image 202-1 of "Jane," and transmits a first temporal indicator 204-1 associated with the first sequential subtitle image 202-1. The first temporal indicator 204-1 indicates a first display duration of 500 ms for display of the first sequential subtitle image 202-1. Moreover, the server 110 transmits, to the electronic device 130 at a second time $T_2$ 208, a second sequential subtitle image 202-2 of "Jane runs," and transmits a second temporal indicator 204-2 associated with the second sequential subtitle image 202-2. The second temporal indicator 204-2 indicates a second display duration of 300 ms for display of the second sequential subtitle image 202-2. Moreover, the server 110 transmits, to the electronic device 130 at a third time $T_3$ 210, a third sequential subtitle image 202-3 of "Jane runs fast.," and transmits a third temporal indicator 204-3 associated with the third sequential subtitle image 202-3. The third temporal indicator 204-3 indicates a third display duration of 400 ms for display of the third sequential subtitle image 202-3.

Figure 2B:
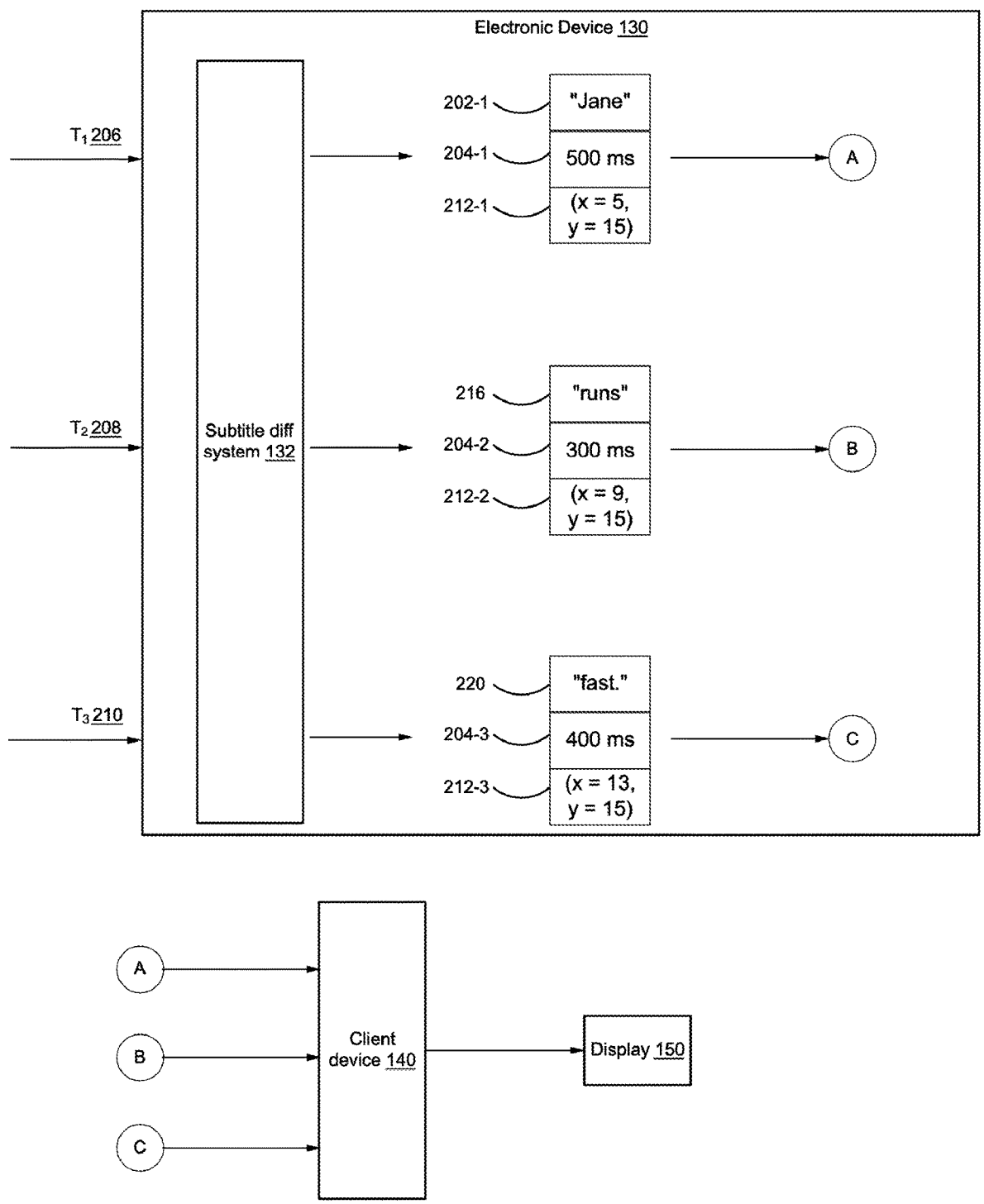

As illustrated in FIG. 2B, based on the aforementioned outputs from the server 110, the subtitle diff system 132 performs diff operations, and determines corresponding display position indicators.

With respect to the first sequential subtitle image 202-1, in some embodiments the subtitle diff system 132 may determine that "Jane" is the first word of a sentence because the first sequential subtitle image 202-1 includes only one word. Thus, in some embodiments, the subtitle diff system 132 foregoes performing a diff operation on the first sequential subtitle image 202-1 because there is not another word against which to diff. Moreover, in some embodiments, the subtitle diff system 132 determines a first display position indicator 212-1 associated with the first sequential subtitle image 202-1. Namely, the first display position indicator 212-1 includes an x position of 5 and a y position of 15. For example, the xy position of (5,15) may correspond to a desirable pixel location of a display at which to display a first word of a text string, such as a location near the left edge of the display, at a vertically central location. The electronic device 130 transmits, to the client device 140, the first sequential subtitle image 202-1, the first temporal indicator 204-1, and the first display position indicator 212-1.

With respect to the second sequential subtitle image 202-2, in some embodiments the subtitle diff system 132 may determine that performing a diff operation on the sequential subtitle image 202-2 is appropriate because "Jane runs" includes multiple words. Accordingly, the subtitle diff system 132 performs a diff operation on the second sequential subtitle image 202-2 to determine a first diff image 216 of "runs." For example, the subtitle diff system 132 removes "Jane" from "Jane runs" because the first sequential subtitle image 202-2 also includes the word "Jane." Moreover, in some embodiments, the subtitle diff system 132 determines a second display position indicator 212-2 associated with the first diff image 216. Namely, the second display position indicator 212-2 includes an x position of 9 and a y position of 15. For example, the x position of 9 is selected so the first diff image 216 would be displayed horizontally offset to the right of and not overlapping with the first sequential subtitle image 202-1 of "Jane." As one example, the subtitle diff system 132 determines the x position of 9 based on the length of the previous word. Accordingly, were the previous word longer (e.g., "Michael" instead of "Jane"), the subtitle diff system 132 may determine an x position that is greater than 9 for the first diff image 216, and vice versa for a shorter preceding word. The electronic device 130 transmits, to the client device 140, the first diff image 216, the second temporal indicator 204-2, and the second display position indicator 212-2.

With respect to the third sequential subtitle image 202-3, in some embodiments the subtitle diff system 132 may determine that performing a diff operation on the third sequential subtitle image 202-3 is appropriate because "Jane runs fast." includes multiple words. Accordingly, the subtitle diff system 132 performs a diff operation on the third sequential subtitle image 202-3 to determine a second diff image 220 of "fast." Moreover, in some embodiments, the subtitle diff system 132 determines a third display position indicator 212-3 associated with the second diff image 220. Namely, the third display position indicator 212-3 includes an x position of 13 and a y position of 15. For example, the x position of 13 is selected so as to be horizontally offset with respect to (e.g., to the right of) the x position of 9 of the previous word ("runs") of the first diff image 216. Namely, the x position of 13 is selected because the previous word ("runs") has four characters. On the other hand, if the previous word had fewer characters (e.g., "is" instead of "runs"), the subtitle diff system 132 may determine an x position that is less than 13 for the second diff image 220. The electronic device 130 transmits, to the client device 140, the second diff image 220, the third temporal indicator 204-3, and the third display position indicator 212-3.

FIGS. 2C-2H illustrated display of the aforementioned subtitle content via the display 150. For example, according to various embodiments, the client device 140 directs the display 150, based on metadata including temporal position indicators and display position indicators.

Figure 2C:
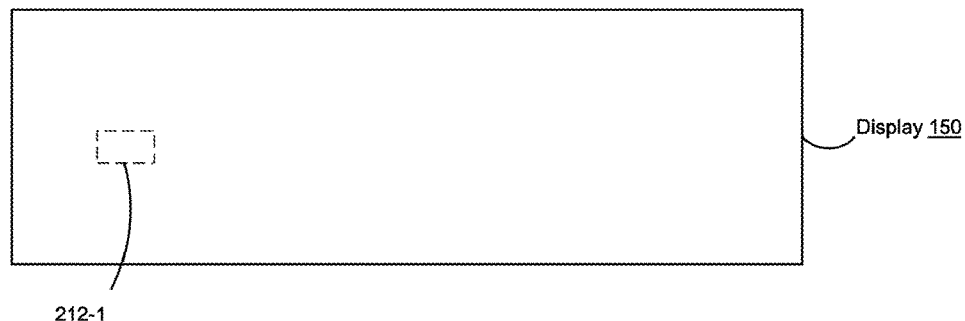
Figure 2D:
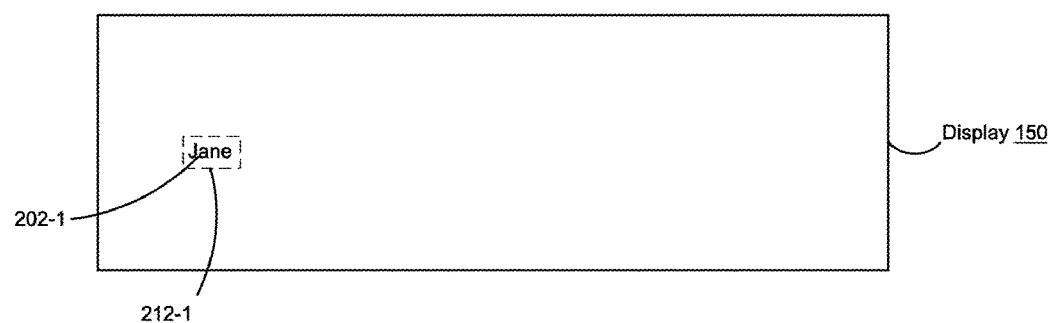

As illustrated in FIG. 2C, a first portion of the display 150 corresponds to the xy location indicated by the first display position indicator 212-1. Accordingly, as illustrated in FIG. 2D, the client device 140 directs the display 150 to display the first sequential subtitle image 202-1 of "Jane" at the first portion of the display 150. Moreover, because the first temporal indicator 204-1 indicates a first display duration of 500 ms, the client device 140 directs the display 150 to display the first sequential subtitle image 202-1 for 500 ms.

Figure 2E:
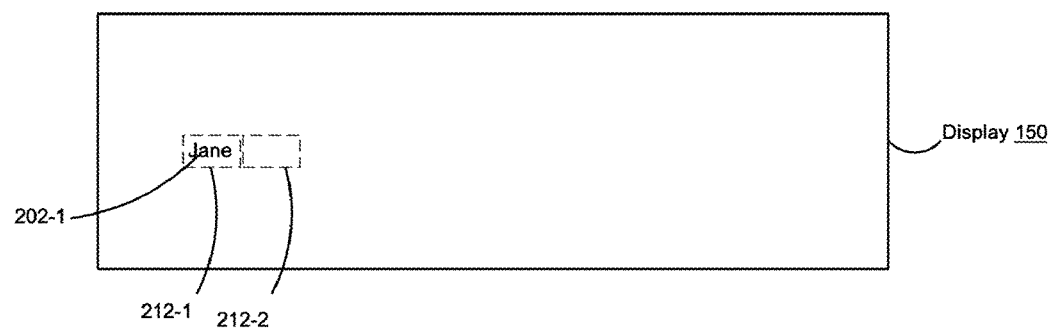
Figure 2F:
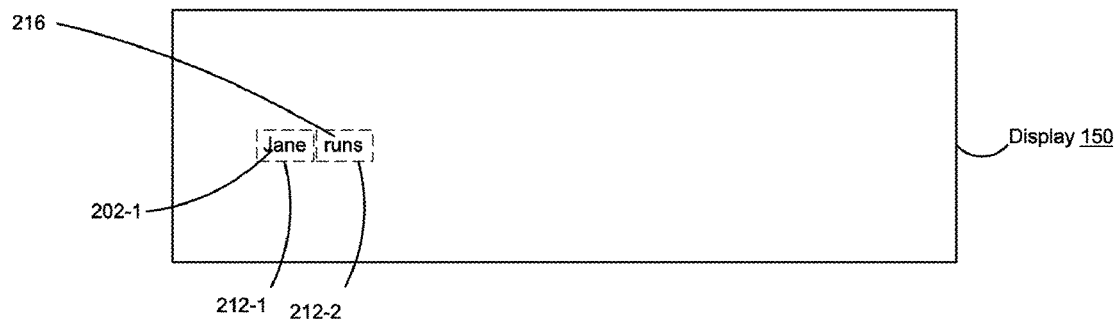

As illustrated in FIG. 2E, a second portion of the display 150 corresponds to the xy location indicated by the second display position indicator 212-2. Accordingly, as illustrated in FIG. 2F, the client device 140 directs the display 150 to display the first diff image 216 of "runs" at the second portion of the display 150. Moreover, because the second temporal indicator 204-2 indicates a second display duration of 300 ms, the client device 140 directs the display 150 to display the first diff image 216 for 300 ms.

Additionally, the client device 140 directs the display 150 to extend the display duration of the first sequential subtitle image 202-1, so that the first sequential subtitle image 202-1 of "Jane" is displayed concurrently with the first diff image 216 of "runs." Namely, because the first diff image 216 is associated with the second display duration of 300 ms, the client device 140 directs the display 150 to extend display of the first sequential subtitle image 202-1 from 500 ms to 800 ms (500 ms+300 ms).

Figure 2G:
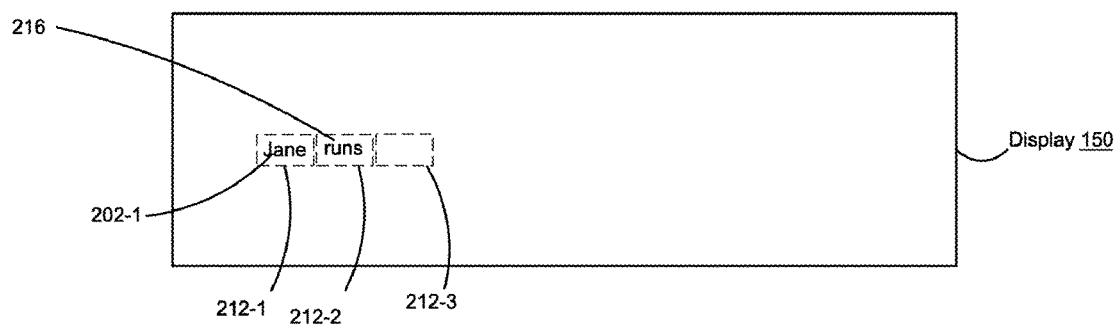
Figure 2H:
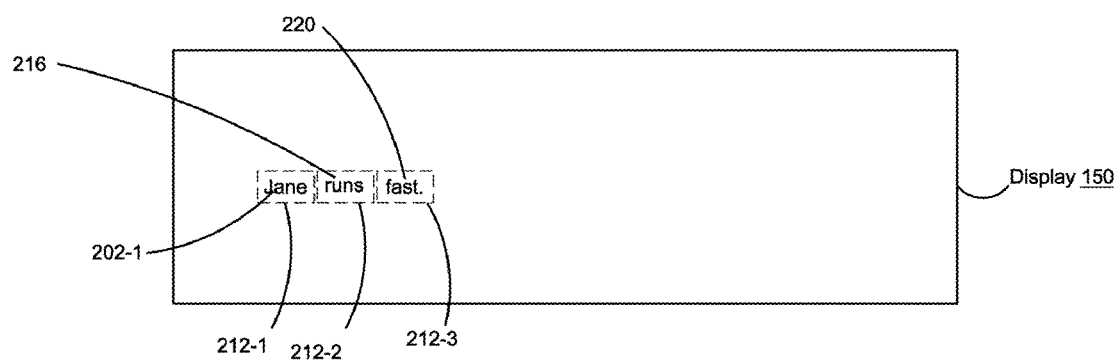

As illustrated in FIG. 2G, a third portion of the display 150 corresponds to the xy location indicated by the third display position indicator 212-3. Accordingly, as illustrated in FIG. 2H, the client device 140 directs the display 150 to display the second diff image 220 of "fast." at the third portion of the display 150. Moreover, because the third temporal indicator 204-2 indicates a third display duration of 400 ms, the client device 140 directs the display 150 to display the second diff image 220 for 400 ms.

Additionally, the client device 140 directs the display 150 to further extend the display duration of the first sequential subtitle image 202-1, so that the first sequential subtitle image 202-1 of "Jane" is displayed concurrently with the second diff image 220 of "fast." Namely, because the second diff image 220 is associated with the third display duration of 400 ms, the client device 140 directs the display 150 to extend the display of the first sequential subtitle image 202-1 from 800 ms to 1200 ms (800 ms+400 ms).

Additionally, the client device 140 directs the display 150 to extend the display duration of the first diff image 216, so that first diff image 216 of "runs" is displayed concurrently with the second diff image 220 of "fast." Namely, because the second diff image 220 is associated with the third display duration of 400 ms, the client device 140 directs the display 150 to extend display of the first diff image 216 from 300 ms to 700 ms (300 ms+400 ms).

Figure 3:
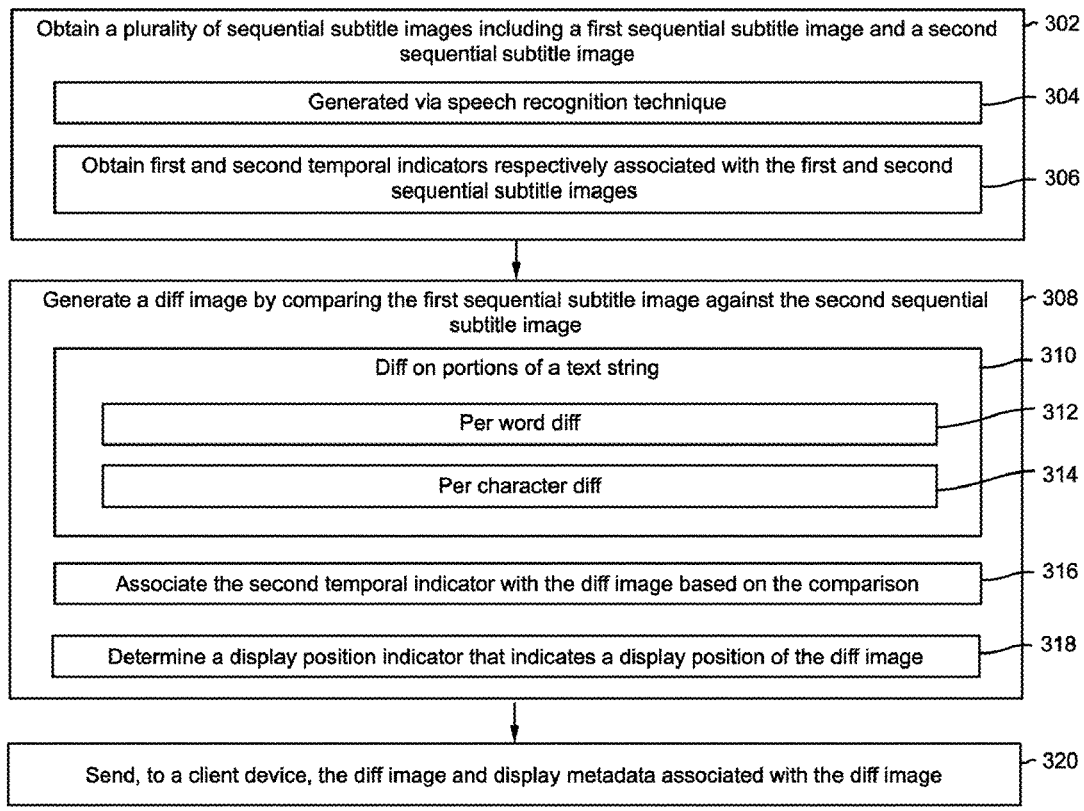
FIG. 3 is an example of a flow diagram of a method of diffing sequential subtitle images in accordance with some embodiments.

FIG. 3 is an example of a flow diagram of a method 300 of diffing sequential subtitle images in accordance with some embodiments. In some embodiments, the method 300 or portions thereof is performed by at an electronic device including a processor and a non-transitory memory, such as the electronic device 130 described with reference to FIG. 1A or 1B. In some embodiments, the method 300 or portions thereof is performed by a controller that is integrated in a device. In some embodiments, the method 300 or portions thereof is performed by an apparatus with a processor, a non-transitory memory, and a communication interface. In some embodiments, the method 300 or portions thereof is performed by a system with a processor, a non-transitory memory, and a communication interface.

As represented by block 302, the method 300 includes obtaining a plurality of sequential subtitle images including a first sequential subtitle image and a second sequential subtitle image. For example, with reference to FIG. 1A, the electronic device 130 obtains the plurality of sequential subtitle images 112 from the server 110. In some embodiments, the plurality of sequential subtitle images is packaged as a live closed caption—e.g., one subtitle word is displayed at a time, in a serial fashion. To that end, in some embodiments and as represented by block 304, a server performs speech recognition (e.g., via the speech recognition system 111) on audio data, in order to generate the plurality of sequential subtitle images. In some embodiments, obtaining the plurality of sequential subtitle images is according to a P2P protocol, such as WebRTC. In some embodiments, a server renders the plurality of sequential subtitle images in the cloud, and transmits the rendered plurality of sequential subtitle images to an electronic device performing the method 300.

As represented by block 306, in some embodiments, obtaining the plurality of sequential subtitle images includes obtaining a first temporal indicator that indicates a display time associated with the first sequential subtitle image, and obtaining a second temporal indicator that indicates a display time associated with the second sequential subtitle image. For example, a temporal indicator indicates one or more of a starting display time of a corresponding sequential subtitle image, an ending display time of the corresponding sequential subtitle image, or a display duration of the corresponding sequential subtitle image. As one example, with reference to FIG. 2A, the first temporal indicator 204-1 indicates a first display duration of 500 ms for the display of the first sequential subtitle image 202-1.

As represented by block 308, the method 300 includes generating a diff image by comparing the first sequential subtitle image against the second sequential subtitle image. The diff image includes content that is absent from the first sequential subtitle image and present in the second sequential subtitle image. For example, with reference to FIG. 2B, the first diff image 216 includes "runs," which is absent from the first sequential subtitle image 202-1 ("Jane") and present in the second sequential subtitle image 202-2 ("Jane runs").

In some embodiments, generating the diff image is based on receiving a diff indicator that indicates that performing a diff operation is appropriate. For example, with reference to FIGS. 1A and 2A, the server 110 sends, to the electronic device 130, a diff indicator that indicates that a diff operation is appropriate for the second sequential subtitle image 202-2 because the second sequential subtitle image 202-2 includes multiple words. On the other hand, the server 110 does not send, to the electronic device 130, a diff indicator regarding the first sequential subtitle image 202-1 because the first sequential subtitle image 202-1 includes a single word.

As represented by block 310, in some embodiments, generating the diff image includes comparing different portions of a text string against each other. For example, the first sequential subtitle image includes a first portion of a text string, and the second sequential subtitle image includes the first portion of the text string and a second portion of the text string that succeeds the first portion in the text string. Continuing with this example, generating the diff image includes removing the first portion of the text string from the second sequential subtitle image.

As represented by block 312, in some embodiments, the method 300 includes performing a diff operation on a per word basis. In some embodiments, the first portion of the text string includes a first word of the text string, and the second portion of the text string includes the first word and a second word of the text string that directly succeeds the first word. As one example, with reference to FIGS. 2A and 2B, generating the first diff image 216 includes removing the first word of the text string ("Jane") from the second sequential subtitle image 202-2. In some embodiments, the first portion of the text string corresponds to a plurality of intermediate words of the text string, and the second portion of the text string corresponds to a word that succeeds the plurality of intermediate words. For example, with reference to FIGS. 2A and 2B, generating the second diff image 220 of "fast." includes removing an intermediate word of "Jane" from the third sequential subtitle image 202-3, and removing an intermediate word of "runs" from the third sequential subtitle image 202-3.

As represented by block 314, in some embodiments, the method 300 includes performing a diff operation on a per character basis. For example, the first portion of the text string includes a first character of the text string, and the second portion of the text string includes the first character and a second character of the text string that comes after (e.g., succeeds) the first character.

In some embodiments, the method 300 includes performing a diff operation on a per-pixel basis, which may or may not include diffing on text. For example, the first sequential subtitle image includes a first emoji, and the second sequential subtitle image includes the first emoji and a second emoji. Continuing with this example, generating the diff image includes removing the first emoji from the second sequential subtitle image, while maintaining the second emoji.

As represented by block 316, in some embodiments, the method 300 includes associating the second temporal indicator with the diff image based on the comparison. For example, as illustrated in FIG. 2A, the electronic device 130 obtains the second temporal indicator 204-2 associated with the second sequential subtitle image 202-2. Continuing with this example, with reference to FIG. 2B, the electronic device 130 associates the second temporal indicator 204-2 with the first diff image 216.

As represented by block 318, in some embodiments, the method 300 includes determining, based on the comparison, a display position indicator that indicates a display position of the diff image on a display. For example, as illustrated in FIG. 2F, based on the second display position indicator 212-2, the client device 140 directs the display 150 to display the first diff image 216 ("runs") to the right of the preceding first sequential subtitle image 202-1 of "Jane." In some embodiments, determining the display position indicator is based on a dimensional characteristic associated with the first sequential subtitle image. For example, the dimensional characteristic includes a length (e.g., in x space) of the first sequential subtitle image or a height (e.g., in y space) of the first sequential subtitle image. In some embodiments, the method 300 includes determining the display position indicator such that the display position of the diff image is proximate to the display position of the preceding first sequential subtitle image. The display position indicator may indicate a horizontal offset (e.g., x position) of the diff image relative to the first sequential subtitle image and/or a vertical offset (e.g., y position) of the diff image relative to the first sequential subtitle image. For example, in some embodiments, the diff image is displayed in a new row that is below (e.g., lower y value than) the preceding displayed first sequential subtitle image.

As represented by block 320, the method 300 includes sending, to a client device, the diff image and display metadata associated with the diff image. The display metadata enables the client device to display the diff image and the first sequential subtitle image with respect to each other. For example, the display metadata includes the first and second temporal indicators, described with reference to block 306. As another example, the display metadata includes an indication that the second temporal indicator is associated with the diff image, described with reference to block 316. As yet another example, the display metadata includes the display position indicator, described with reference to block 318. The examples described with reference to FIGS. 2C-2H describe utilizing the temporal indicators and display position indicators to direct display of various subtitle image content relative to each other, with appropriate timing.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be collocated or not collocated. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
  at an electronic device including a processor and a non-transitory memory:
    obtaining a plurality of sequential subtitle images including a first sequential subtitle image and a second sequential subtitle image;
    generating a diff image by comparing the first sequential subtitle image against the second sequential subtitle image, wherein the diff image includes content that is absent from the first sequential subtitle image and present in the second sequential subtitle image; and
    sending, to a client device, the diff image and display metadata associated with the diff image.

2. The method of claim 1, wherein obtaining the plurality of sequential subtitle images includes:

obtaining a first temporal indicator that indicates a display time associated with the first sequential subtitle image, and obtaining a second temporal indicator that indicates a display time associated with the second sequential subtitle image;

wherein the display metadata includes the first and second temporal indicators.

3. The method of claim 2, wherein the first temporal indicator indicates one or more of:
- a starting display time of the first sequential subtitle image,
- an ending display time of the first sequential subtitle image, or
- a display duration of the first sequential subtitle image; and wherein the second temporal indicator indicates one or more of:
- a starting display time of the second sequential subtitle image,
- an ending display time of the second sequential subtitle image, or
- a display duration of the second sequential subtitle image.

4. The method of claim 2, further comprising associating the second temporal indicator with the diff image based on the comparison, wherein sending the display metadata includes sending an indication that the second temporal indicator is associated with the diff image.

5. The method of claim 1, further comprising determining, based on the comparison, a display position indicator that indicates a display position of the diff image on a display, wherein the display metadata includes the display position indicator.

6. The method of claim 5, wherein the display position indicator indicates a horizontal offset of the diff image relative to the first sequential subtitle image.

7. The method of claim 6, wherein the display position indicator further indicates a vertical offset of the diff image relative to the first sequential subtitle image.

8. The method of claim 5, wherein determining the display position indicator is based on a dimensional characteristic associated with the first sequential subtitle image.

9. The method of claim 1, further comprising sending the first sequential subtitle image to the client device, wherein the display metadata enables the client device to display the diff image and the first sequential subtitle image with respect to each other.

10. The method of claim 1, wherein the first sequential subtitle image includes a first portion of a text string, wherein the second sequential subtitle image includes the first portion of the text string and a second portion of the text string that succeeds the first portion of the text string, and wherein generating the diff image includes removing the first portion of the text string from the second sequential subtitle image.

11. The method of claim 10, wherein the first portion of the text string corresponds to a first word of the text string, and wherein the second portion of the text string corresponds to a second word of the text string.

12. The method of claim 10, wherein the first portion of the text string corresponds to a plurality of intermediate words of the text string, and wherein the second portion of the text string corresponds to a word that succeeds the plurality of intermediate words.

13. The method of claim 10, wherein the first portion of the text string corresponds to a first character of the text string, and wherein the second portion of the text string corresponds to a second character of the text string.

14. The method of claim 1, further comprising generating the plurality of sequential subtitle images via a speech recognition technique.

15. An electronic device comprising:
- a processor; and
- a non-transitory memory storing computer-readable instructions, which when executed by the processor, cause the electronic device to:
  - obtain a plurality of sequential subtitle images including a first sequential subtitle image and a second sequential subtitle image;
  - generate a diff image by comparing the first sequential subtitle image against the second sequential subtitle image, wherein the diff image includes content that is absent from the first sequential subtitle image and present in the second sequential subtitle image; and
  - send, to a client device, the diff image and display metadata associated with the diff image.

16. The electronic device of claim 15, wherein the computer-readable instructions when executed by the processor, cause the electronic device to determine, based on the comparison, a display position indicator that indicates a display position of the diff image on a display, wherein the display metadata includes the display position indicator.

17. The electronic device of claim 16, wherein the display position indicator indicates a horizontal offset of the diff image relative to the first sequential subtitle image and/or a vertical offset of the diff image relative to the first sequential subtitle image.

18. The electronic device of claim 15, wherein the first sequential subtitle image includes a first word of a text string, wherein the second sequential subtitle image includes the first word and a second word of the text string that succeeds the first word, and wherein generation of the diff image includes removing the first word from the second sequential subtitle image.

19. The electronic device of claim 15, wherein the first sequential subtitle image includes a first character, wherein the second sequential subtitle image includes the first character and a second character, and wherein generation of the diff image includes removing the first character from the second sequential subtitle image.

20. A non-transitory computer-readable medium that includes computer-readable instructions stored thereon that are executable by a processor of an electronic device to perform operations comprising:
- obtaining a plurality of sequential subtitle images including a first sequential subtitle image and a second sequential subtitle image;
- generating a diff image by comparing the first sequential subtitle image against the second sequential subtitle image, wherein the diff image includes content that is absent from the first sequential subtitle image and present in the second sequential subtitle image; and
- sending, to a client device, the diff image and display metadata associated with the diff image.

* * * * *